UNITED STATES PATENT OFFICE.

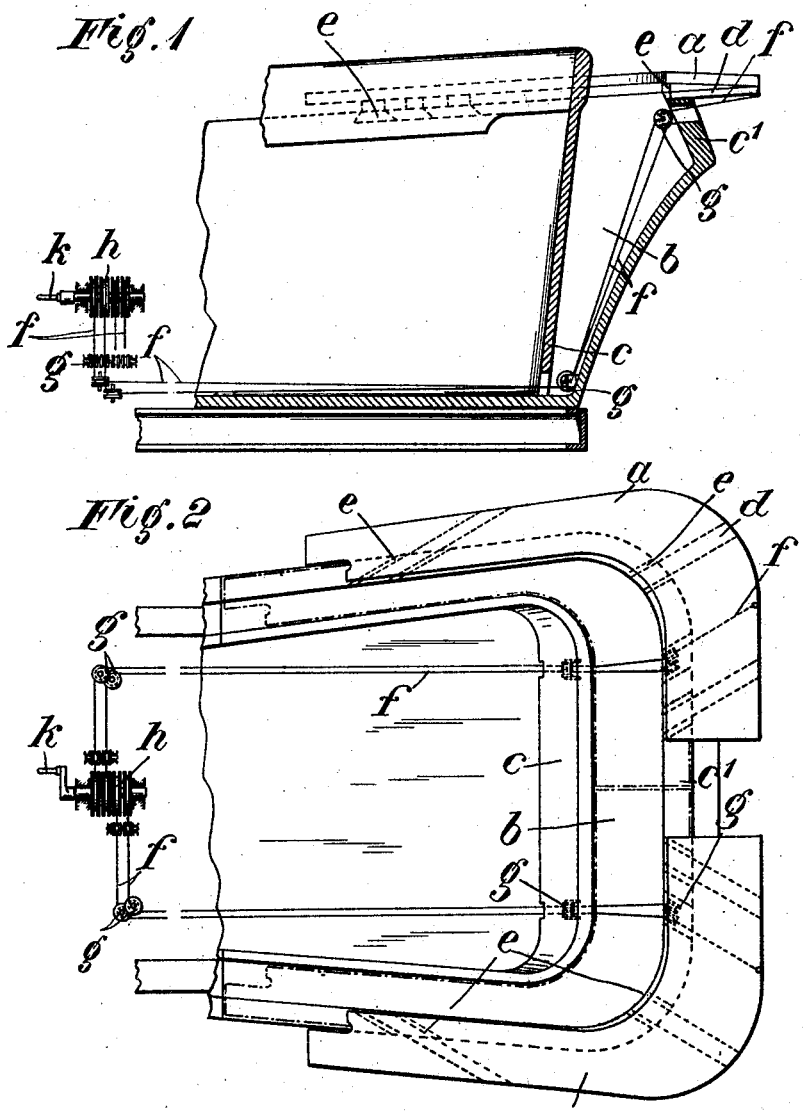

CONRAD GEBHARD, OF MUNICH, GERMANY, ASSIGNOR TO THE FIRM "ASFAG" AKTIENGESELLSCHAFT, OF GLARUS, SWITZERLAND.

COVERING DEVICE FOR FOLDING HOODS OF VEHICLES.

1,415,332.     Specification of Letters Patent.    Patented May 9, 1922.

Application filed December 1, 1920. Serial No. 427,639.

*To all whom it may concern:*

Be it known that I, CONRAD GEBHARD, a citizen of the Republic of Germany, residing at Munich, Tegernseerlandstrasse 135, Germany, have invented certain new and useful Improvements in Covering Devices for Folding Hoods of Vehicles; and I do hereby declare the following to be a clear, full, and exact description of the invention, such as will enable others skilled in the art to which it appertains to make and use the same, reference being had to the accompanying drawing, and to letters or figures of reference marked thereon, which form a part of this specification.

Covering devices for folding hoods of vehicles comprising two curved portions opening sideways towards the outside to disclose the space containing the folding hood, are well known.

This invention relates to a covering device of the above type of simpler construction and more convenient to handle than those already known, the said covering device can be opened or closed at will from the driver's or any other place of the vehicle, without it being necessary to stop and to alight. The novelty of the invention resides in the fact that the curved covering portions are supported in such a manner as to be able to be drawn out diagonally in prismatic guides and that they are moved simultaneously from one point by means of pulling members.

The accompanying drawing shows an example of a covering device of this kind.

Fig. 1 shows a part section through the rear portion of the coachwork of a vehicle.

Fig. 2 is a plan of the same.

Two covering parts $a$ are disposed over space $b$ containing the folded hood (not shown in the drawing), these parts $a$ are curved, their shape corresponding to that of the exterior of the vehicle, they are supported slidably on the outer side of the vehicle and to this purpose are fitted with prismatic rails $d$ which slide in similar guides $e$ in the side $c^1$.

Three guides are provided for each of the two parts $a$, these are placed near each end and at the middle, they are parallel one to the other and are inclined diagonally towards the outside, in such a manner that the parts $a$ when pulled outwards, equally disclose space $b$, which they completely cover when slid inwardly.

The covering parts $a$ are moved by means of strings $f$ of which two are provided for each part, one for opening and one for closing. To this purpose the strings are attached to opposite points of part $a$, they are guided on rollers towards the driver's seat, where all the strings are attached to a drum $h$ fitted with a handle $k$. By revolving the drum to the right or to the left, either the opening or closing strings are wound around the drum, and thus the parts $a$ are equally pulled out or in, disclosing or covering up space $b$ (latter position is shown by dotted lines in Fig. 2).

I claim:

1. A covering device for the folding hoods of vehicles, comprising two curved parts for covering the space of the vehicle that contains the folded hood, said parts abutting against each other in the longitudinal central plane of the vehicle, prismatic guides supporting said parts and arranged obliquely to the vehicle body, and means operated from a point inside the vehicle and operatively connected to said two curved parts to simultaneously move said covering device parts to cover or uncover the folded hood.

2. A covering device for folding hoods of vehicles, comprising two curved covering parts slidably supported in prismatic guides so as to allow of their being drawn out in an oblique direction to the vehicle body, two pulling members being provided for each of the two covering parts, attached to opposite points of the latter and winding around a drum so that the covering parts may be simultaneously opened or closed according to the direction in which said drum is revolved.

3. A covering device for folding hoods of vehicles, comprising two angular parts for covering the space of the vehicle that contains the folded hood, said parts abutting against each other in the longitudinal central plane of the vehicle, prismastic guide means extending in an oblique direction to the vehicle body and interposed between the latter and said covering parts, two pulling members provided for each covering part and attached to points near the front and the rear edge of said parts and near the edges with which said parts abut, the pulling members being wound around a drum placed inside the vehicle whereby the covering parts may be simultaneously opened or closed according to the direction in which the said drum be revolved.

CONRAD GEBHARD.